UNITED STATES PATENT OFFICE.

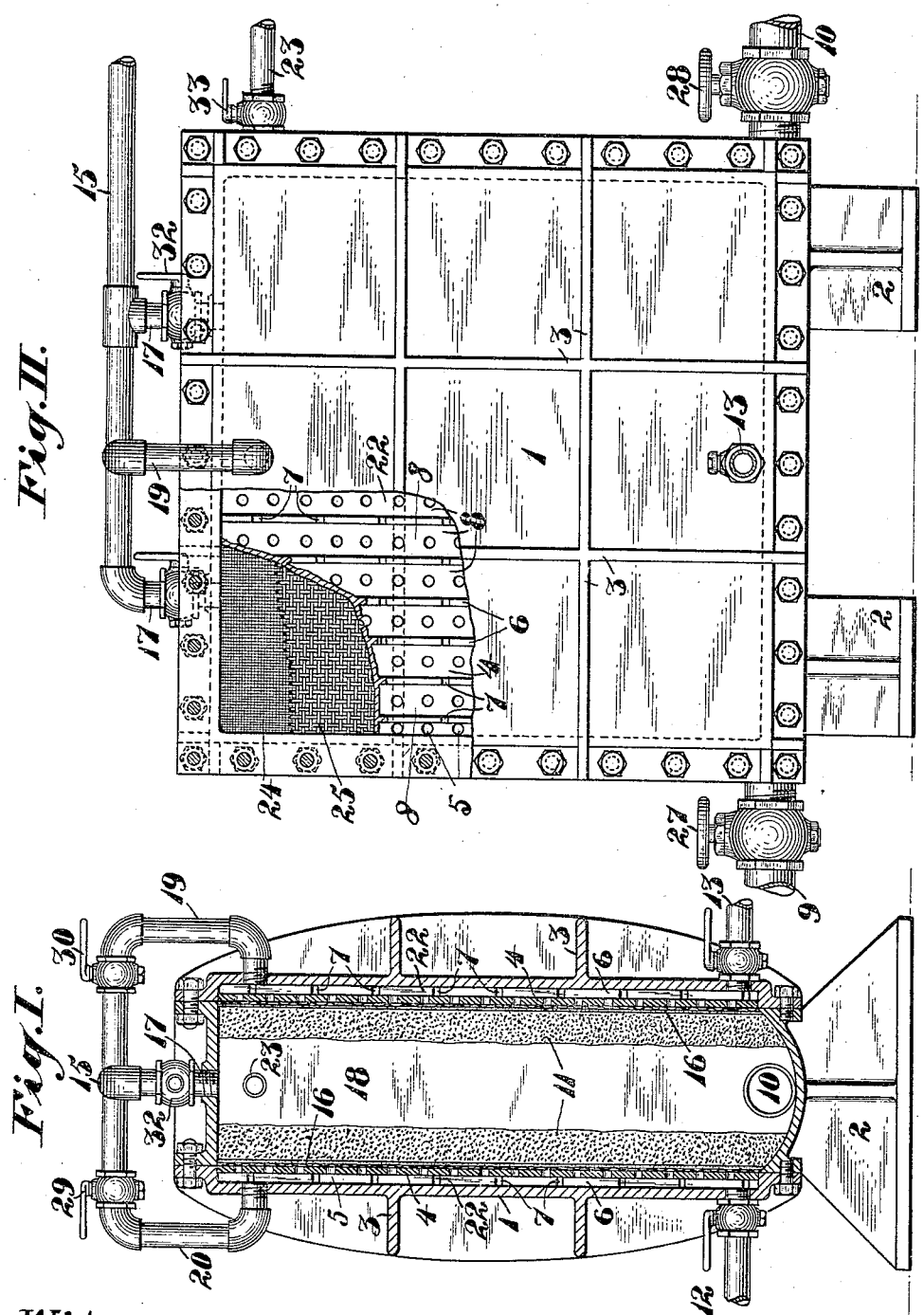

BERTRAM HUNT, OF SAN FRANCISCO, CALIFORNIA.

FILTERING APPARATUS.

No. 841,526.  Specification of Letters Patent.  Patented Jan. 15, 1907.

Application filed April 4, 1906. Serial No. 309,830.

*To all whom it may concern:*

Be it known that I, BERTRAM HUNT, a subject of the King of Great Britain, residing at San Francisco, county of San Francisco, and State of California, have invented certain new and useful Improvements in Filtering Apparatus; and I do hereby declare the following to be a full, clear, and exact description of the same, reference being had to the accompanying drawings, forming a part of this specification.

This invention relates to filtering apparatus especially adapted for extracting chemical solutions from pulverized ore, but also applicable to other like purposes and to certain improvements in such apparatus, as set forth in the specification that follows and is illustrated by accompanying drawings, that form a part thereof.

My invention consists in a system of independent filtering units each comprising a closed vessel or chamber capable of sustaining internal pressure required to filter out or express the liquid from the solids treated, this chamber double walled at its sides, the inner walls pervious and covered with a filtering-web of a fibrous or textile nature through which the liquid filtrates or solution is expressed and flows by gravity from between the inner and outer walls, the main chamber connected to a supply under pressure of the substance to be treated and also to some source of fluid-pressure, preferably air compressed in the usual manner, and to a water-supply for flushing.

My improvement also consists in a means of dislodging the filtered material by a countercurrent of water or air, or of both, to act within and without the main chamber.

Also it consists in the combination and arrangement of parts, as hereinafter more fully explained by the aid of the drawings.

The object of my invention is to extract by fluid-pressure the liquid or filtrate from the material treated, the removal of the filtered material by sluicing and other means that render the process almost automatic and continuous, also the avoidance of manual handling and the disposition of a filtering plant in uniform units, so as to control its extent and capacity by their number, thus saving in complication and expense, also the construction and operation of such apparatus.

To these ends I provide filtering apparatus as shown in the drawings.

Figure I is a vertical transverse section through one unit of a filtering plant constructed according to my invention, and Fig. II a side view of the same unit with a portion of the side broken away.

In the usual process of filtering, especially for ores treated chemically by solution, the impediments are the intermittent and consequent slow performance and the manual labor involved in the removal and replacement of the material treated. Both these impediments I seek to overcome by attaining a nearly-continuous operation of the filtering process and avoidance of manual labor, the latter consisting only in opening and closing cocks.

Referring to the drawings, 1 is the main chamber, supported on pedestals 2 and provided with reinforcing-ribs 3 to resist flexure from internal pressure, the whole separable, as shown by bolted joints in Fig. I.

The internal filtering-plates 4 are made with perforations 5 and ribs 6, the latter resting against the walls of the main vessel 1 and having interruptions or notches 7, that permit lateral communication between all the spaces 8, forming a collecting-chamber 22 for the liquid or filtrates.

9 is an inlet-way for the pulp or substance to be treated, and 10 an outlet-way for the drained material expressed from the material 11, which as it is drained disposes itself in a stratum at the sides, as seen in Fig. I.

15 is a water-flushing pipe connecting at 17 to the main chamber 18 and by the branches 19 and 20 to the filtrate-chamber 22.

23 is a pipe for air under pressure connecting with the chamber 18.

The filtering-surface 16 is commonly composed of a textile or fibrous web 24, and behind this a supporting-web 25 of woven wire that rests on the inner surface of the plates 4, as shown in Fig. II. This web or filtering medium 16 may, however, be of felt or other pervious material and varied in character to suit the nature of the substance treated.

In operating with my improved filtering apparatus the pulp or material is in a saturated and liquid form forced into the chamber 18 through the inlet-pipe 9 and valve 27 by means of a pump or other means of producing the degree of pressure required to express the filtrate or solution through the webs 16. The pipe 10 and valve 28 being closed and the filtrate-pipes 12 and 13 open, the solution in the pulp entering through the pipe 9 is forced through the filter-web 16 into the chamber 22 and conducted through the pipes 12 and 13 to a suitable receptacle for future use or other disposal. As the pulp or material being treated accumulates in the chamber 18 the solids adhere to the filtering-surfaces, beginning at the bottom and building up as the filtering-webs 16 become less pervious, forming cakes 11, as shown in Fig. I. When these cakes 11 have assumed a thickness that hinders filtration or that is found to be suitable, the excess of pulp remaining in the chamber 18 is forced back by compressed air admitted through valve 33 and pipe 23, valves 12 and 13 being closed, and returned to the vessel containing the supply of pulp. Wash-water or wash solution is then forced into the chamber 18 under suitable pressure through pipe 9, and pipes 12 and 13 being opened passes through the cakes, thus displacing any valuable solution remaining in the cakes. When the washing is found to be complete, valve 27 is closed and the corresponding discharge-valve 28 is opened. The flushing-valve 32 is then opened, admitting water under pressure from the pipe 15 into the chamber 18. Water in the pipe 15 being under pressure flushes out the filtered material 11 through the pipe 10; but in case this material is compacted and does not break up or dissolve and adheres to the filter-webs 16 the pipes 12, 13, and 17 are closed and the cocks 29 and 30 are opened, admitting water under pressure to the filtrate-chamber 22, causing a counter-pressure and reverse flow through the filter-webs, dislodging the cakes 11, which will then crumble and be discharged through the pipe 10. If such discharge is not performed by the flushing-water from the pipes 19 and 20 for want of volume or other cause, air under pressure is turned into the chamber 18 through the pipe 23 and cock 33, or, if it is desired to send back and refilter in whole or in part the material 11, this can be done by closing the valve 28, removing pressure in the pipe 9, opening the valve 27, thus driving the material 11 back to the source of supply. In this manner it will be seen all required operations are by fluid action and controlled by valves and cocks operated by an attendant, also that in case of a battery or series of such filtering units the action in each may be simultaneous, uniform, and controlled by a unitary means, the pipes 9, 10, 12, 13, 15, 17, 19, and 23 being arranged accordingly.

I do not confine myself to a particular form for the main vessel or unit. This can be of any suitable shape or dimensions to suit the volume of material to be treated and the circumstances of erection and use.

Having thus explained the nature and objects of my invention, what I claim as new, and desire to secure by Letters Patent, is—

1. In filtering apparatus, a closed vessel having removable outer walls, perforated plates within said walls with a closed central cavity between, said perforated plates being also separated from said outer walls respectively to form chambers, pervious filtering-webs on the inner surfaces of said perforated plates, inlet and outlet pipe connections to said central cavity at bottom, with controlling-valves, inlet-pipe connections to said cavity at top, with controlling-valves, outlet-pipe connections to said chambers respectively at bottom, with controlling-valves, and inlet-pipe connections to said chambers at top, with controlling-valves, substantially as specified.

2. In filtering apparatus, a series of closed vessels each having externally-ribbed removable walls, perforated plates within said walls, with a closed central cavity between, said plates also spaced from said walls to form external chambers, pervious filtering-webs on the inner surfaces of said perforated plates, inlet and outlet pipe connections to said central cavity at bottom, with controlling-valves, inlet-pipe connections to said cavity at top, with controlling-valves, outlet-pipe connections to said chambers respectively at bottom, with controlling-valves, and inlet-pipe connections to said chambers at top, with controlling-valves, substantially as specified.

3. In filtering apparatus, a main filtering vessel or chamber, a supply of fluid mineral pulp or other like material connected thereto, removable filter-plates forming double walls in this chamber, these inner filter-plates perforated and provided with ribs at their back to bear against the walls of the main chamber and form there a space or chamber to collect the liquid or filtrate forced through the plates and through filtering-webs thereon, substantially as specified.

4. In filtering apparatus, an inclosed chamber connected to a fluid-supply under pressure of mineral pulp or other material to be filtered, a connected supply of water under pressure to flush out the inclosed chamber, also a connected air-supply under pressure to force back unfiltered material to the source of supply with valves and cocks to control the different fluids in these several operations arranged and operating substantially as specified.

In testimony whereof I have signed my name to this specification in the presence of two subscribing witnesses.

BERTRAM HUNT.

Witnesses:
JAMES MASON.
ELMER WICKES.